United States Patent
Yue et al.

(10) Patent No.: US 7,159,975 B2
(45) Date of Patent: Jan. 9, 2007

(54) INK AND FIXER FLUID COMPOSITIONS HAVING A CHARGED BUFFER

(75) Inventors: Shungiong Yue, San Diego, CA (US); Christian Schmid, Rancho Bernard, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 262 days.

(21) Appl. No.: 10/688,428

(22) Filed: Oct. 16, 2003

(65) Prior Publication Data

US 2005/0083385 A1 Apr. 21, 2005

(51) Int. Cl.
*B41J 2/17* (2006.01)
(52) U.S. Cl. .................................... 347/95; 347/100
(58) Field of Classification Search .............. 347/101, 347/100, 95, 96, 28, 20, 22; 523/160; 106/31.6, 106/31.13, 31.27
See application file for complete search history.

(56) References Cited

U.S. PATENT DOCUMENTS

| | | | |
|---|---|---|---|
| 4,572,831 A | 2/1986 | Rosen | |
| 5,679,143 A * | 10/1997 | Looman | 106/31.43 |
| 5,785,743 A | 7/1998 | Adamic et al. | |
| 6,036,759 A | 3/2000 | Wickramanayake et al. | |
| 6,281,267 B1 | 8/2001 | Parazak | |
| 6,312,100 B1 | 11/2001 | Loosli et al. | |
| 6,354,693 B1 | 3/2002 | Looman et al. | |
| 6,503,978 B1 | 1/2003 | Tsao et al. | |
| 2003/0082350 A1 | 5/2003 | Tsao | |

FOREIGN PATENT DOCUMENTS

| | | |
|---|---|---|
| EP | 0626428 | 11/1994 |
| WO | WO 89/09247 | 10/1989 |

* cited by examiner

*Primary Examiner*—Manish S. Shah

(57) ABSTRACT

A marking fluid or fixing fluid for inkjet printing consisting a buffering agent with both a first functional group with a pKa at most 1.0 units away from the pH of the marking fluid or fixing fluid and a second functional group with a pKa at least 2.0 pH units away from the pH of the marking fluid or fixing fluid such that at the marking fluid or fixing fluid pH the second functional group is in its completely charged form.

26 Claims, No Drawings

INK AND FIXER FLUID COMPOSITIONS HAVING A CHARGED BUFFER

FIELD OF THE INVENTION

The invention relates to inkjet inks and fixer fluids which are acidic.

BACKGROUND ART

It is known that printing an acidic ink or fixer, typically a fluid containing an organic acid, together with a pigmented ink which is basic or neutral causes the pigments to destabilize or "crash" on the print media. This "crashing" effect causes improved optical density, strikethrough and edge acuity and decreased bleed.

A problem with these acidic inks and fixers is that the acid partitions or cuts into printhead plastics and adhesives over time. This problem has been mostly ignored until recently because the expected lifetime of a printhead has been relatively short, e.g., a few years. Furthermore, printheads have been relatively inexpensive to replace.

Ways to crash pigments without an acidic ink or fixer have also been found. Rather than employing acids, multivalent metal salts (e.g. calcium nitrate) have been employed in an ink or fixer fluid. Such solutions have been found to minimize adhesive degradation, but have lead to poor pen reliability because of the problems of decap and kogation caused by the salts.

As printheads have become larger and more expensive and have been designed to last longer, there has arisen a need to solve the problems caused by acidic inks and fixers partitioning into printhead adhesives.

SUMMARY OF INVENTION

The present invention relates to a marking or fixing fluid used in inkjet printing comprising a buffering agent having at least one first functional group with a pKa at most 1.0 units away from the marking or fixing fluid pH and an at least one second functional group with a pKa at least 2.0 units away from the marking or fixing fluid pH, such that at the marking or fixing fluid pH the at least one second functional group is in its completely charged form.

The present invention further relates to a method of preventing partitioning into plastic and adhesives by a marking or fixing fluid in an inkjet printhead, the method comprising:
using a marking or fixing fluid in the inkjet printhead, the marking or fixing fluid comprising a buffering agent having at least one first functional group with a pKa at most 1.0 units away from the marking or fixing fluid pH and an at least one second functional group with a pKa at least 2.0 units away from the marking or fixing fluid pH, such that at the marking or fixing fluid pH the at least one second functional group is in its completely charged form.

The present invention further relates to a system for printing with reduced partitioning into plastic and adhesive portions of an inkjet printhead comprising:
the inkjet printhead containing a marking or fixing fluid comprising a buffering agent having at least one first functional group with a pKa at most 1.0 units away from the marking or fixing fluid pH and an at least one second functional group with a pKa at least 2.0 units away from the marking or fixing fluid pH, such that at the marking or fixing fluid pH the at least one second functional group is in its completely charged form, and such that when the marking or fixing fluid contacts the plastic and adhesive portions there is substantially no partitioning.

DETAILED DESCRIPTION OF THE INVENTION

A buffered, acidic fixer or ink can be used with a neutral or basic pigment-based ink to destabilize the pigments when they are printed on media. This destabilization or "crashing" of the pigments in the presence of the acidic fixer or ink causes the pigments to better adhere to the surface of the paper. This leads to improved optical density, bleed, strikethrough, and edge acuity performance in the printed images.

When organic acids, such as succinic acid, have been used in the buffered, acidic fixer or ink, the printhead adhesives in contact with the inks have had a greatly increased tendency to swell. There is evidence that the protonated form of acidic buffers such as succinic acid has a strong tendency to partition into organic materials in the printhead such as organic materials used in plastics and adhesives. This degrades printhead performance by producing effects such as weight gain, die bow, and die cracking in the printhead.

In current applications, printheads are often larger, more expensive, and expected to have a longer service life than they previously were. Thus, achieving the compatibility between printhead marking materials, such as ink and fixer, and adhesives used in printhead construction becomes more important in meeting printer performance goals.

The present invention relates to inks or fixer fluids that contain a buffer molecule having a permanent charge at the ink pH, in place of the more traditional mono-functional buffers (buffers that have a significant fraction of uncharged species). In a preferred embodiment of the present invention, the ink or fixer fluid is a dye-based ink. In another preferred embodiment, the dye-based ink is printed together with a pigment-based ink. In another preferred embodiment, the ink or fixer fluid is a fixer fluid.

To effectively hold an ink at a given pH, a buffer is needed. Such a buffer must have an ionizable group with a pKa near the ink pH. When the ink pH equals the pKa of a certain ionizable group, half of these groups are ionized and half are not. Thus, for a traditional mono-functional buffer, there will exist a significant fraction of buffer molecules that are not charged at the ink pH. There is evidence that such uncharged species have a strong tendency to partition into plastics and adhesives in the printhead, and thus lead to adhesive degradation.

The present invention relates to a buffer that is permanently charged at the ink or fixer pH. Such a buffer must have multiple functional groups, with somewhat disparate pka's. Thus, one or more of the groups has pka's near the ink or fixer pH, at most having pKa's 1.0 units from the ink or fixer pH, to achieve a buffering effect. In a preferred embodiment the ink or fixer has pKa's at most 0.5 units from the ink or fixer pH. But at least one group must have a pKa far from the ink or fixer pH, at least 2.0 units away from the ink and fixer pH, such that this group is 100% ionized at the ink pH. In a preferred embodiment the ink or fixer has pKa's at least 3.0 units away from the ink and fixer pH. Such a buffer is thus prevented from partitioning into plastics and adhesives in the printhead.

A non-limiting example of buffering acids that can be used in inks and fixers of the present invention are amino acids, such as β-alanine or 4-aminobutyric acid, 6-aminocaproic acid, 2-aminoterephthalic acid, L-aspartic acid, dimethylamino benzoic acid, and methyl-amino benzoic acid in an ink where the pH is 4. These amino acids have carboxylic acid functionality with pKa near 4, and an amine group with pKa near 10. Thus these acids are not only effective buffers when the pH is 4, they have a protonated amine at this pH which is thought to make them less likely to partition into adhesives.

When a fixer fluid containing 1–10% of such amino acids is printed with pigmented inks, superior image quality, better than that obtainable with the pigmented inks alone, is obtained. Furthermore, the amino acids lead to much better compatibility with various adhesives than can be achieved with acids that do not have a permanent charge.

EXAMPLES

Example 1

Amine-cured epoxy adhesive was exposed to fixer fluid at 70° C. for 21 days and then examined. Fixer fluids containing 4% acid of either acetic acid, succinic acid, or glutaric acid respectively lead to greater than 11% weight gain, causing die bow and die cracking in the adhesive. The weight gain of the adhesive in the fixer fluid containing 4% β-alanine was decreased to 4%, eliminating die bow and die cracking issues.

Example 2

Six fixer and ink compositions were prepared containing various buffer formulations. Each fixer or ink composition was used to soak cured adhesive bars in the size of 20 mm×10 mm×4 mm. The soaking was conducted at 70° C. for four weeks. Various combinations of succinic acid, 1,2-hexanediol and β-alanine were used in the buffer formulations. Specific combinations and results are given below in Table 2.

TABLE 2

| Ink or Fixer soaking Moat Fill | Succinic acid | 1,2-hexanediol | β-alanine | Weight gain after 4 weeks at 70° |
|---|---|---|---|---|
| Fixer fluid #1 (Buffered, pH = 4) | 3% | 7% | | 10.1% |
| Ink (Buffered, pH = 4) | 5.2% | | | 6.6% |
| Fixer fluid #2 (Buffered, pH = 4) | 4% | | | 4.0% |
| Fixer fluid #1 (Unbuffered, pH = 4) | | 7% | | 4.4% |
| Fixer fluid #3 (Buffered, pH = 4) | | 7% | 3% | 4.1% |

Fixer fluid #1 of the above Table 2 is described below in Table 3A.

Fixer fluid #2 has: 15% organic solvents but lacks the 1,2-hexanediol of Fixer fluid #1. Fixer fluid #2 also has 0.5% water soluble surfactants, 4% succinic acid, 3% cationic polymer, and the balance water. Fixer fluid #3 is identical to Fixer fluid #1 except that it contains: 4% beta-alanine instead of 4% succinic acid.

The ink of Table 2 consists of: 20% organic solvents but no 1,2-hexanediol, 4% water soluble surfactants, 5% succinic acid, 3% anionic dye, and the balance water, 2P and 3% blend of polyethyleneimine and polyguanadine.

Example 3

The impact of adhesive type, fixer succinic acid level, and fixer pH on adhesive weight gain and softening was tested. The fixer fluids tested are given as follows in Table 3A:

TABLE 3A

| Component | Fixer fluid #1 (weakly buffered, pH = 4) | Fixer fluid #1 (Buffered, pH = 4, minus polymer) | Fixer fluid #1 (Buffered, pH = 4) |
|---|---|---|---|
| 1,2-hexanediol | 7.5% | 7.5% | 7.5% |
| Tetramethylene sulfone | 7.5% | 7.5% | 7.5% |
| Brij 30 (CAS No: 5274-68-0) | 0.4% | 0.4% | 0.4% |
| Zonyl FSN (Fluorosurfactant) | 0.3% | 0.3% | 0.3% |
| β-alanine | 0.2% | 0.2% | 0.2% |
| Succinic acid | 0% | 3% | 3% |
| Fixing agent (guanadine cationic polymer) | 0% | 0% | 4% |

Two adhesives were tested. Adhesive Material A contains an amine hardener. Adhesive Material B contains two other types of amine hardeners.

A weight gain test was done by placing cured adhesive bars in the size of 20 mm×10 mm×4 mm into 20 ml glass bottles. To these, 20 ml of fixer was added (which was enough to cover the entire part). The parts in bottles were then placed in an oven for two weeks at 70° C. Weights were measured after 1 week and 2 weeks. Fixer pH's were also checked at this time. A few of the fixers in the bottles had drifted by ~0.2 units and were adjusted back to their original values. Overall there was not a major fluid pH drift with or without parts in the fluid, in this two week test. All weights were measured right after rinsing the parts with water and then blotting dry. Rheological testing was also performed on the Rheometrics DMTA. Parts were removed from the fixer, rinsed with water and blotted dry. Bars were stressed in 3 point bending geometry, medium sample holder (22 mm span). Tests were run at a frequency of 10 Hz, at a strain amplitude of 0.05% (low enough to assume linear viscoelastic response). The temperature ramp was done at 2 degrees C. per minute.

Weight gain data over 2 weeks, 70° C. is presented in Table 3B.

TABLE 3B

| Sample # | Material | Fluid | pH | Succinic acid, wt % | % wt gain, 2 wk, 70° C. | % wt gain after 3 days in vac over at 100° C., 6" Hg |
|---|---|---|---|---|---|---|
| 1 | Material A | dry (ambient) | | | 0.2 | not measured |
| 2 | Material A | dry (ambient) | | | 0.3 | 0.4 |
| 5 | Material A | dry | | | 0.3 | not measured |
| 6 | Material A | dry | | | 0.3 | 1.3 |
| 9 | Material A | Fixer Fluid #1 (minus polymer, buffered) | 4 | 4 | 12.4 | not measured |
| 10 | Material A | Fixer Fluid #1 (minus polymer, buffered) | 4 | 4 | 12.7 | not measured |
| 13 | Material A | Fixer Fluid #1 (minus polymer, buffered) | 3 | 4 | 21.6 | not measured |
| 14 | Material A | Fixer Fluid #1 (minus polymer, buffered) | 3 | 4 | 21.0 | 15.5 |
| 17 | Material A | Fixer fluid #1 (minus polymer, buffered) | 6 | 4 | 5.4 | not measured |
| 18 | Material A | Fixer fluid #1 (minus polymer, buffered) | 6 | 4 | 4.8 | 2.5 |
| 21 | Material A | Fixer fluid #1 (minus polymer, weakly buffered) | 4 | 0 | 4.2 | not measured |
| 22 | Material A | Fixer fluid #1 (minus polymer, weakly buffered) | 4 | 0 | 4.1 | 3.2 |
| 25 | Material A | Fixer fluid #1 (buffered) | 4 | 4 | 12.9 | not measured |
| 26 | Material A | Fixer fluid #1 (buffered) | 4 | 4 | 10.3 | not measured |
| 3 | Material B | dry (ambient) | | | 0.5 | not measured |
| 4 | Material B | dry (ambient) | | | 0.6 | not measured |
| 7 | Material B | dry | | | −0.5 | not measured |
| 8 | Material B | dry | | | −0.1 | not measured |
| 11 | Material B | Fixer fluid #1 (minus polymer, buffered) | 4 | 4 | 4.4 | not measured |
| 12 | Material B | Fixer fluid #1 (minus polymer, buffered) | 4 | 4 | 4.1 | not measured |
| 15 | Material B | Fixer fluid #1 (minus polymer, buffered) | 3 | 4 | 3.9 | not measured |
| 16 | Material B) | Fixer fluid #1 (minus polymer, buffered) | 3 | 4 | 3.8 | not measured |
| 19 | Material B | Fixer fluid #1 (minus polymer, buffered) | 6 | 4 | 2.2 | not measured |
| 20 | Material B | Fixer fluid #1 (minus polymer, buffered) | 6 | 4 | 2.8 | not measured |
| 23 | Material B | Fixer fluid #1 (minus polymer, weakly buffered) | 4 | 0 | 1.9 | not measured |
| 24 | Material B | Fixer fluid #1 (minus polymer, weakly buffered) | 4 | 0 | 2.6 | not measured |
| 27 | Material B | Fixer fluid #1 (buffered) | 4 | 4 | 3.4 | not measured |
| 28 | Material B | Fixer fluid #1 (buffered) | 4 | 0 | 3.0 | not measured |

Based on the above data, for all parts soaked in fixer solutions, there is a strong correlation between weight gain and part 'softening' as quantified by flexural modulus decrease after soak. Also it can be seen that with a constant level of succinic acid and 1,2-hexanediol in the fixer, adhesive weight gain and modulus decrease are more dramatic at low fixer pH (i.e., 3 is worse than 4 which is worse than 6). Furthermore, Material A samples, when dried under vacuum after the ink soak, do not return to their original weights. Instead they remain at greater weights suggesting that non-volatile components like succinic acid are present in the adhesives.

For Material A, lower fixer pH sharply increases weight gain—21%, 12.5% and 5% weight gain at pH 3, 4, and 6 respectively. As can be seen, for Material A at pH=4, samples 9, 10 with 3% succinic acid have greater weight gain (12.5%) compared to samples 21, 22 without succinic acid (4%). Reproducibility of results is fairly good—most replicate weight gain measurements are within ~1%.

Example 4

Fixer fluids were made with the components of fixer fluid #1 (at pH=4, buffered and minus polymer) in Table 3A above except that succinic acid (present at 0.339 mol/L in fixer fluid #1) was replaced with 0.339 mol/L of other acids: nitric acid, glutaric acid, acetic acid, β-alanine, and glycine.

The same experiments were performed with the above fixer fluids as were described in Example 3 to obtain weight gain data over 2 weeks, 70° C.

The experiments showed that when various buffering agents having a range of pH's are used, greater weight gain is observed at lower pH. Also, at constant molar buffer concentration and pH, fixers containing zwitterionic acids such as β-glycine alanine and glycine induce less weight gain than regular organic acids (acetic, glutaric, succinic, etc.). Results are shown in Table 4 below.

TABLE 4

| Sample # | materials | fluid pH | acid (all at 0.339 M) | % wt gain |
|---|---|---|---|---|
| 1 | Material A | dry | dry | −0.5% |
| 3 | Material A | pH = 0.5 | nitric acid | 46.2% |
| 5 | Material A | pH = 4 | nitric acid | 5.1% |
| 7 | Material A | pH = 3.2 | acetic acid | 16.9% |
| 9 | Material A | pH = 4 | acetic acid | 11.4% |
| 11 | Material A | pH = 4 | β-alanine | 4.7% |
| 13 | Material A | pH = 4 | glutaric acid | 13.4% |
| 15 | Material A | pH = 4 | glycine | 4.3% |
| 9 | Material A | pH = 4 | none | 12.4% |
| 2 | Material B | dry | dry | 0.0% |
| 4 | Material B | pH = 0.48 | nitric acid | 9.4% |
| 6 | Material B | pH = 4 | nitric acid | 2.2% |
| 8 | Material B | pH = 3.2 | acetic acid | 4.3% |
| 10 | Material B | pH = 4 | acetic acid | 4.2% |
| 12 | Material B | pH = 4 | β-alanine | 2.4% |
| 14 | Material B | pH = 4 | glutaric acid | 4.0% |
| 16 | Material B | pH = 4 | glycine | 3.2% |
| 11 | Material B | pH = 4 | succinic acid | 4.4% |

All fluids in Table 4 based on buffered pH=4 fixer fluid #1 (minus polymer), with succinic acid replaced by acids listed above.

What is claimed is:

1. A marking or fixing fluid used in inkjet printing, consisting essentially of:
   a vehicle; and
   an amino acid buffering agent having at least one first functional group with a pKa at most 1.0 units away from the marking or fixing fluid pH and an at least one second functional group with a pKa at least 2.0 units away from the marking or fixing fluid pH, such that at the marking or fixing fluid pH the at least one second functional group is in its completely charged form.

2. A marking or fixing fluid according to claim 1, wherein the buffering agent has at least one first functional group with a pKa at most 0.5 units away from the marking or fixing fluid pH.

3. A marking or fixing fluid according to claim 1, wherein the buffering agent has at least one second functional group with a pKa at least 3.0 units away from the marking or fixing fluid pH.

4. A marking or fixing fluid according to claim 1 wherein the marking or fixing material is approximately pH 4 and the buffering agent is selected from the group consisting of β-alanine, 4-aminobutyric acid, 6-aminocaproic acid, 2-aminoterephthalic acid, L-aspartic acid, dimethylamino benzoic acid, and methyl-amino benzoic acid.

5. A marking or fixing fluid according to claim 1, wherein the marking or fixing fluid is a dye-based ink.

6. A marking or fixing fluid according to claim 5, wherein the dye-based ink is printed together with a pigment based ink.

7. A marking or fixing fluid according to claim 1, wherein the marking or fixing material is a fixer fluid.

8. A marking or fixing fluid according to claim 7, wherein the fixer fluid is printed together with a pigment based ink.

9. A method of preventing partitioning into plastic and adhesives by marking or fixing fluid in an inkjet printhead, the method comprising:
   using a marking or fixing fluid in the inkjet printhead, the marking or fixing fluid consisting essentially of: a vehicle; and an amino acid buffering agent having at least one first functional group with a pKa at most 1.0 units away from the marking or fixing fluid pH and an at least one second functional group with a pKa at least 2.0 units away from the marking or fixing fluid pH, such that at the marking or fixing fluid pH, the at least one second functional group is in its completely charged form.

10. A method according to claim 9, wherein the buffering agent has at least one first functional group with a pKa at most 0.5 units away from the marking or fixing fluid pH.

11. A method according to claim 9, wherein the buffering agent has at least one second functional group with a pKa at least 3.0 units away from the marking or fixing fluid pH.

12. A method according to claim 9, wherein the marking or fixing fluid is approximately pH 4 and the buffering agent is selected from the group consisting of β-alanine, 4-aminobutyric acid, 6-aminocaproic acid, 2-aminoterephthalic acid, L-aspartic acid, dimethylamino benzoic acid, and methyl-amino benzoic acid.

13. A method according to claim 9, wherein the marking or fixing fluid is a dye-based ink.

14. A method according to claim 13, wherein the dye-based ink is printed together with a pigment based ink.

15. A method according to claim 9, wherein the marking or fixing fluid is a fixer fluid.

16. A method according to claim 15, wherein the fixer fluid is printed together with a pigment based ink.

17. A system for printing with reduced partitioning into plastic and adhesive portions of an inkjet printhead, comprising:
   the inkjet printhead containing a marking or fixing fluid consisting essentially of: a vehicle; and an amino acid buffering agent having at least one first functional group with a pKa at most 1.0 units away from the marking or fixing fluid pH and at least one second functional group with a pKa at least 2.0 units away from the marking or fixing material pH, such that the at least one second functional group is in its completely charged form;
   wherein when the marking or fixing fluid contacts the plastic and adhesive portions there is substantially no partitioning.

18. A system according to claim 17, wherein the buffering agent has at least one first functional group with a pKa at most 0.5 units away from the marking or fixing fluid pH.

19. A system according to claim 17, wherein the buffering agent has at least one second functional group with a pKa at least 3.0 units away from the marking or fixing fluid pH.

20. A system according to claim 17, wherein the marking or fixing fluid is approximately pH 4 and the buffering agent is selected from the group consisting of β-alanine, 4-aminobutyric acid, 6-aminocaproic acid, 2-aminoterephthalic acid, L-aspartic acid, dimethylamino benzoic acid, and methyl-amino benzoic acid.

21. A system according to claim 17, wherein the marking or fixing fluid is a dye-based ink.

22. A system according to claim 21, wherein the dye-based ink is printed together with a pigment based ink.

23. A system according to claim 17, wherein the marking or fixing fluid is a fixer fluid.

24. A system according to claim 23, wherein the fixer fluid is printed together with a pigment based ink.

25. A marking or fixing fluid used in inkjet printing, comprising:

a buffering agent having at least one first functional group with a pKa at most 1.0 units away from the marking or fixing fluid pH and an at least one second functional group with a pKa at least 2.0 units away from the marking or fixing fluid pH, such that at the marking or fixing fluid pH, the at least one second functional group is in its completely charged form;

wherein the marking or fixing fluid does not include an organic acid having no basic functional groups.

26. The marking or fixing fluid according to claim 25 wherein the organic acid having no basic functional groups is selected from succinic acid, acetic acid, and glutaric acid.

* * * * *